United States Patent

[11] 3,578,171

| [72] | Inventor | David Usher<br>9010 Roselawn Ave., Huntington Woods,<br>Detroit, Mich. 48204 |
|---|---|---|
| [21] | Appl. No. | 812,780 |
| [22] | Filed | Apr. 2, 1969 |
| [45] | Patented | May 11, 1971 |

[54] APPARATUS FOR REMOVING FLOATING POLLUTANTS
3 Claims, 7 Drawing Figs.

[52] U.S. Cl. .................................................. 210/242, 210/513
[51] Int. Cl. ...................................................... B01d 21/00
[50] Field of Search ............................................ 210/83, 242, 513; 61/1, 6

[56] References Cited

UNITED STATES PATENTS

| 2,330,508 | 9/1943 | McColl ........................ | 210/242 |
| 2,891,672 | 6/1959 | Veld et al. ..................... | 210/242 |
| 2,968,928 | 1/1961 | Wicklander ................... | 61/1 |
| 3,245,539 | 4/1966 | Earle ............................. | 210/242 |
| 3,369,664 | 2/1968 | Dahan ........................... | 210/242X |
| 3,491,023 | 1/1970 | McCormich ................... | 210/83 |

FOREIGN PATENTS

| 804,368 | 12/1958 | Great Britain ................. | 210/242 |
| 953,743 | 4/1964 | Great Britain ................. | 61/1 |

Primary Examiner—John Adee
Attorney—Cullen, Sloman and Cantor

ABSTRACT: Apparatus for removing oil and other floating pollutants from a body of water employing a barge which consists of means for encompassing a slick and confining it to prevent lateral spreading, skimming and withdrawing the pollutant under vacuum to a storage area on a barge, pumping into settling tanks and simultaneously siphoning off the water; and transporting a barge and its pollutant removal equipment by one from the group consisting of air, truck and rail, to any remote point for emergency use.

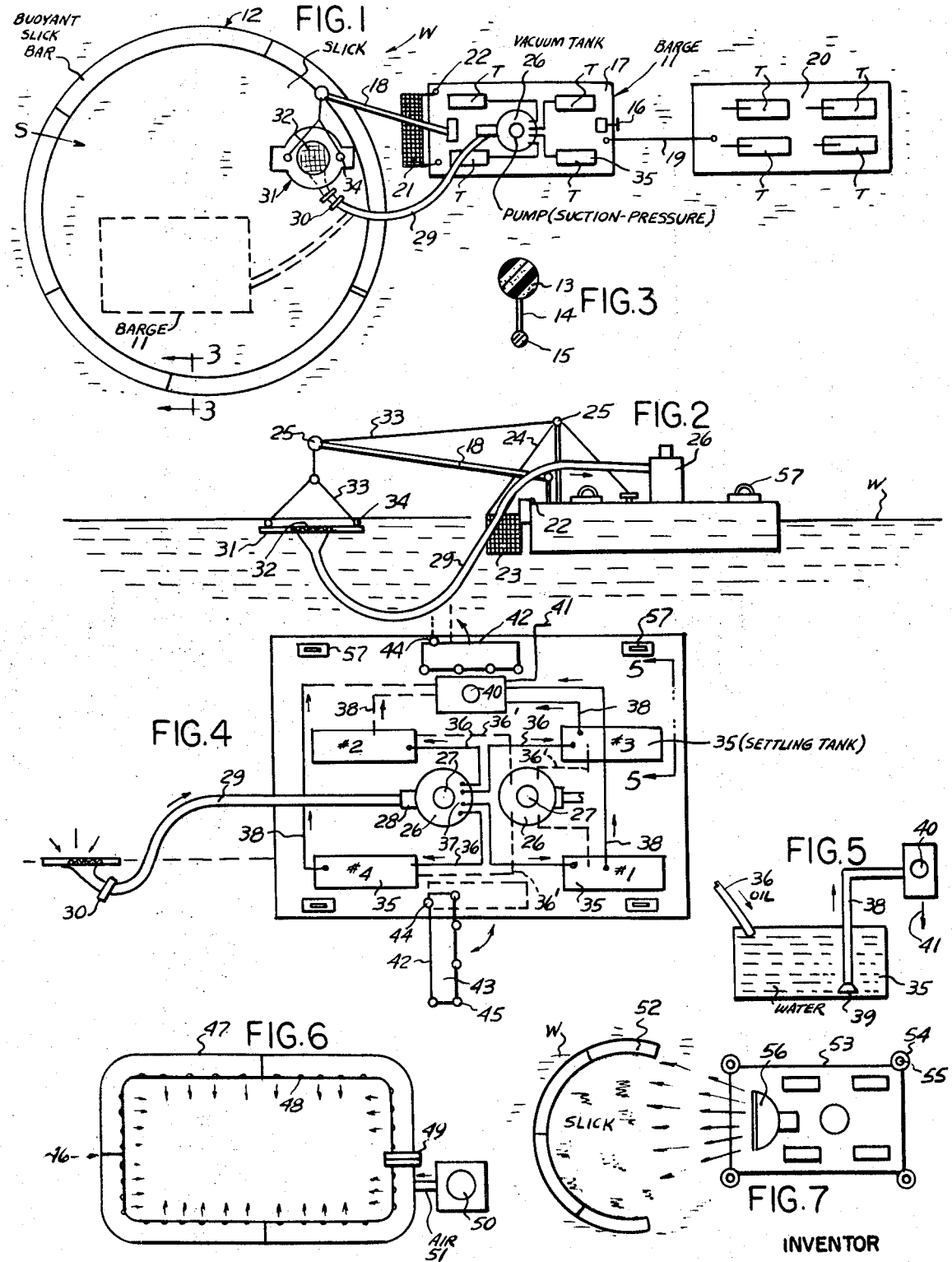

APPARATUS FOR REMOVING FLOATING POLLUTANTS

BACKGROUND OF THE INVENTION

There has long existed the accidental or otherwise pollution of the waters by the escape thereinto of oil and other hazardous liquid spills with the result that surrounding water is contaminated and values deteriorated, loss of animal life and fire hazards.

One of the main problems in connection with such pollutants is the method of removing these spills or slicks from the water surface. These problems are augmented by the many physical variations involved and surface changes which include current and wind, tides if any and movement of navigation.

In conjunction with the removal of such pollutants normally floating upon a water body an element of primary importance is the encirclement and containment of this pollutant to permit its skimming from the water surface.

It is the object of the present invention to provide a self-propelled antipollution barge, namely a flat bottomed barge employed for the removal of oil and other floating pollutants from the body of water and wherein the said barge and its equipment involved may be removed from the water and quickly transported by truck, by rail or by plane to remote parts of the countryside for emergency use as needed.

It is another object to provide in conjunction with the barge equipment in the nature of a buoyant slick bar or elongated continuous pollutant confining device which floats upon the water surface and which is adapted to confine a large area thereof to facilitate skimming of the floating pollutant for storage into settling tanks within the barge.

It is another object to provide an improved pollutant skimmer for the suction withdrawing of floating pollutants including oils for projection into a vacuum storage tank upon the barge after which the pollutants are pumped into settling tanks and with the settled out water at the bottom thereof simultaneously siphoned away until the settling tanks themselves are substantially full of pollutants only.

It is another object to provide efficient vacuum producing and pressure producing means upon the barge by which the fluids skimmed may be injected into a storage tank and thereafter and successively pumped into settling tanks in a continuous process by which the water settling out therefrom at the bottom of the tank is siphoned away in a continuous manner.

It is a further object to provide an improved method of removing floating pollutants from a body of water which consists of the steps of locating a slick of oil or other pollutant, the encompassing of the slick, the skimming of the slick into a storage area and the pumping of said pollutant materials into settling tanks and with the simultaneous separation of the water therefrom for discharge back into the surrounding water body.

It is still another object to provide a novel use for an antipollution barge adapted for the removal of oils and other floating pollutants by which the barge is of such construction that the same may be readily boomed or otherwise removed from the water body and transported by truck, by rail or by air to remote distant points for emergency use as needed.

These and other objects will be seen from the following specification and claims in conjunction with the appended drawing in which:

FIG. 1 is a schematic plan view showing a barge and associated slick bar floating upon a water body with the floating contaminants surrounded by the slick bar being skimmed off for storage upon the barge.

FIG. 2 is a schematic side elevation of the barge and skimming assembly.

FIG. 3 is a fragmentary section taken in the direction of arrows 3-3 of FIG. 1.

FIG. 4 is a fragmentary plan schematic view of barge and its pumping and tank equipment with associated skimmer.

FIG. 5 is a side elevational view of a skimmer tank as a section taken in the direction of arrows 5-5 of FIG. 4, on an increased scale.

FIG. 6 is a plan view of an air barrier type of slick bar for the confinement and containment of buoyant pollutants for a skimming operation.

FIG. 7 is a schematic plan view showing a barge containing air moving equipment for blowing floating pollutant into a contained area.

Referring to the drawing, a flat bottomed barge generally indicated at 11 in accordance with the present invention may be transported by air, by truck or by rail to remote points on emergency need for placement in a water body W containing a slick or other body of floating pollutant such as oil for illustration. The present antipollutant self-propelled barge carries sections of the slick bar 12 or other pollutant confining device which is buoyant and which is made into long sections one to two hundred feet, for example, and which is drawn by a small tender or other boat to surround a large area of slick as at S, FIG. 1, the respective ends of the slick bar being connected to confine an area of floating pollutant throughout 360°. Confinement may be between 180° and 360°.

As shown in the section, FIG. 3, the slick bar includes a cylindrically shaped buoyant body 13 made of a foam plastic material such as styrofoam or the like and depending therefrom is provided a flexible plastic skirt 14 along its length, said skirt being weighted at 15 along its length to provide retaining means for the floating pollutant to an appreciable depth.

The barge includes a self-contained motor or other propelling means 16 and a suitable deck 17 mounting a swing boom 18. As desired, the line 19 connected to the barge may be employed for pulling the secondary tandem barge 20 which includes a series of settling tanks T for excess storage capacity.

Forwardly of the barge deck there is provided debris catcher 21 which is pivotally mounted as at 22, FIG. 2 and thus adapted to be swung into the water body as shown in FIG. 2 and which includes screening on the bottom, ends and on one side to facilitate the picking up of floating debris such as logs or bottles, for illustration.

The line 24 at one end is connected to the debris catcher and moves over the pulley 25 on a suitable mast to control raising and lowering of the debris catcher as desired.

MOunted upon the deck is a suitable vacuum tank 26, and as shown schematically in FIG. 4 secondary vacuum tank 26' is provided.

The respective tanks 26 and 26' include pumping means which may be alternately used either as vacuum pumps or as pressure pumps, said tanks having inlets 28 to which is connected one end of the skimmer hose 29.

The skimmer hose at its free end by the use of elbow fittings 30 is connected to a skimmer assembly 31 having a grilled or screened intake 32 communicating with the skimmer hose 29.

The cables 33, FIG. 2, connected at 34 to the frame of the skimmer extend over a suitable pulley 25' on boom 18 by which the skimmer assembly including the intake 32 may be adjusted vertically so as to be sufficiently below the top surface of the water W and floating pollutant so that such pollutants may be skimmed under vacuum through the hose 29 into the vacuum storage tank 26 and alternately storage tank 26'.

Provided within the barge, preferably below deck 17, are a plurality of settling tanks 35 as shown in FIG. 4.

A series of conduits 36 respectively interconnect vacuum tank 26 and the respective settling tanks 35 which have an additional number identification 1, 2, 3, 4 for identification. Upon the vacuum tank and/or adjacent the one ends of the conduits 36 are suitable valves 37 by which when the tank 26 has been pressurized using the pump 27 as a pressure pump flow of pollutant through the respective conduits 36 can be selectively regulated so that the tanks 1, 2, 3 and 4 are progressively filled with a limited amount at a time to thus prevent an unbalanced condition in the barge to ultimately cause the filling of each of the respective settling tanks 35.

In connection with each settling tank there is provided a water discharge unit which includes siphon pipe 38 which extends down into each of the respective settling tanks having a siphon inlet 39 which is spaced adjacent the bottom of the respective tanks. THe respective siphon tube 38 extends to suction pumping means 40 after which the water withdrawn from the bottom of the respective settling tanks is discharged as at 41 into the surrounding water body.

When the pumping mechanism 27 of the vacuum tank 26 is operating to produce a low pressure condition for introducing skimmed pollutants into the vacuum tank 26, said tank may not be pressurized for the delivery of the pollutants to the respective settling tanks. Accordingly, by employing a secondary storage area such as the vacuum tank 26' which, for example, may already be filled with skimmed pollutants, during the period that vacuum tank 26 is being filled with pollutants, the pumping mechanism 27 for the secondary vacuum tank 26' could be serving as a pump for pumping fluid pollutants therefrom into the respective settling tanks. Thus the two tanks 26 and 26' may be functioning simultaneously to avoid delays in the filling of the respective settling tanks.

Additional conduits 36' are shown in dotted lines interconnecting the respective settling tanks with the secondary vacuum tank 26'.

In the illustrative embodiment as schematically shown in FIG. 4 there are provided a pair of horizontally disposed outrigger assemblies 42 which include platform 43 and the pivot mount 44 by which the outriggers may be swung to the solid line position shown in FIG. 4. The respective outriggers 42 include protective railing as at 45 at least along one of the sides thereof.

The outrigging may be used for various purposes such as the manual adaptation of the skimmer into a slick where pollutant is to be withdrawn, may be used for the manual distribution of pollutant dissolving chemicals or for any other purpose connected with the antipollution functioning of the barge.

The modified slick bar or air barrier is illustrated schematically in FIG. 6 at 46 and which includes a buoyant conduit 47 which may be made up in sections and interconnected in a manner similar to the sections of the slick bar of FIG. 1. This buoyant conduit also maybe of a construction similar to that shown in FIG. 3 which consists of a foam plastic or other buoyant body 13, suitable skirt 14 and weighting at 15 such as shown in FIG. 3.

The buoyant conduit 47 is tubular and includes along its internal edge a series of longitudinally spaced air outlets 48 which extend throughout the internal periphery of the air barrier for the purpose of confining and concentrating the floating pollutant, a suitable connector 49 being employed for interconnecting the respective ends of the buoyant conduit.

A compressor 50 is shown schematically which may be mounted upon the barge deck and which includes conduit 51 for supplying compressed air into the air barrier 47. While in the illustrated embodiment the air barrier is described as being of a length or perimeter dimension of one to two hundred feet, this length can be increased as desired for confining a greater quantity of slick or floating pollutant such as oil.

It is contemplated furthermore that the present antipollutant barge may provide a means of establishing air currents for the blowing of a slick into a slick bar such as the slick bar 52 for containing the slick S within the water body W.

For this purpose the barge schematically shown in FIG. 7 at 53 and of a construction very similar to that described with respect to FIGS. 1 and 4 includes a series of apertured spuds 54 which project laterally outward from the respective corners of the barge.

Anchor pipes 55 project down through the respective spuds and into the ground or other surface at the bottom of the water body for the purpose of anchoring the barge.

Upon the deck of the barge there is provided a power operated air mover or blower 56 by which pollutant may be moved by the wind or air created so as to be confined within the flexible slick bar 52 and thus be eventually encircled for the purpose of skimming in the manner illustrated with respect to FIGS. 1 and 4.

Upon the deck of the barge such as shown at 57, FIGS. 2 and 4 are a plurality of pad eyes 57 which provide a convenient means by which the entire barge and all of its equipment may be boomed or otherwise lifted out of the water surface for placement upon a suitable carrier such as a truck or rail car for transportation to a remote point of need or alternately to an airport by which the entire barge may be moved onto a commercial type of plane as for example the C133 military planes for transportation to a remote point where it may be again boomed into a water body for the purpose of removing floating pollutants.

In the illustrative embodiment, the overall barge including its hull and with all equipment weighs approximately 3½ long tons or 8000 lbs. It is approximately 36 feet long and 12 feet wide. These barges could be made 40 feet long, for illustration, and 10½ feet wide in those cases where it may assist the portability particularly for transporting the same by plane to remote points.

The hull height is approximately 39 inches and includes a flat bottom so as to be capable of movement in shallow waters.

The hull includes the usual collision bulkheads fore and aft and for illustration four settling tanks having a capacity of storing approximately 5360 gallons of pollutants.

In operation the pollutant is floating and has an average depth of approximately 1 inch, though this is variable and by the use of the present slick bar of FIG. 1 or the air barrier or other barriers such as shown in FIG. 6 may be confined and restrained against relative outward spreading movements and this for the purpose of permitting siphoning off using the tank equipment above described.

FIG. 1 illustrates schematically the barge upon the exterior of the slick bar. It is contemplated that the barge shown in dotted lines could be upon the interior of the slick bar.

Since normal water weights approximately 9 pounds per gallon and oil pollutant approximately 8½ pounds per gallon in that area, it is found that the major portion of the oil or bituminous pollutants are floating since these are the ones contemplated to be removed by the present antipollution equipment. The present method for the removing of floating pollutants from a water body such as oils, for illustration, but not limited thereto consists of the following steps:

1. The location of the floating slick of oil or other pollutant.
2. The encompassing of said slick with an elongated floating body 180° to 360° at least to the depth of the pollutant such as by the slick bar 12 of FIG. 1 for preventing the lateral spreading of the pollutant over the water body.
3. Skimming and withdrawing of the confined pollutant under vacuum and transporting same to the storage area out of the water body such as into the vacuum tank 26 or 26'.
4. Successively pumping said stored pollutant from the vacuum tank 26 or 26' into the respective settling tanks 35 along with such water dilutant as passes through the skimmer assembly, the said water settling immediately to the bottom areas of the respective settling tanks.
5. Simultaneously with the filling of the said settling tanks, the siphoning under vacuum of the water from the bottom of the respective settling tanks for discharge into the surrounding water body.

As additional step, there may be provided an alternate storage such as the secondary vacuum tank 26' for the reception of skimmed fluids which during the period that the first vacuum tank 26 is being filled, the second vacuum tank 26' may be pressure emptied through the conduits 36' into the respective settling tanks.

The vacuum pumps provided for the vacuum tanks are motor operated either diesel or air driven for safety purposes. If air driven, then the compressors are operated by diesel motors.

The present antipollution barge includes centrifugal testing equipment for determining the BS and W, namely the bituminous sedimentation in the water.

In unloading the vacuum tanks into the respective settling tanks, the tanks are successively filled, for example, to a 6 inch depth to prevent an unbalanced condition by the functioning of the respective valves 37, FIG. 4, manually to control which tanks are to receive pollutant from the vacuum tank 26. In this manner all of the tanks are filled progressively. When this has been completed, suitable additional connections are provided by which the respective vacuum tanks 36 and 36' may be connected to the secondary settling tanks T shown in the tandem secondary barge 20, FIG. 1.

To render the antipollution barges more efficient for the intended purpose, battery powered telephones may be provided through Marine Communication Bell Telephone Company to provide contact with the land at all times, particularly where the barges are operating under emergency conditions.

The oil removed or other pollutants can be reclaimed and used in industry though the disposition of the oil collected is secondary to the main functioning of the barge.

The present barges employing suitable tanks and power means may be used for the spraying over an area of oil dispersants or other chemicals employing suitable spray bars which may be mounted upon the outriggers 42 as desired.

It is contemplated that by any other suitable buoyant barrier could be employed other than the ones described in the foregoing specification.

While in the illustrative embodiment of the invention, the settling tanks 35 have been described as nested and stored within the hull, it is contemplated that under some conditions the settling tanks may be constructed of rubber or other materials and be exterior to the hull, such as floating within the water adjacent the hull.

A rubber storage tank is contemplated capable of holding between 2,500 and 10,000 gallons. Such tank may be on the exterior of the hull and connected thereto with suitable lines. One such tank is supplied by the Goodyear Rubber Company.

It is, furthermore, contemplated as a part of the present method that in the collection and storage of the pollutant, such as oil, and the separation of the water from the pollutant, the settling tanks or storage tanks may be exterior of the hull in and floating adjacent thereto.

Additionally, it is contemplated that even with the provision of some settling tank arrangement within the hull, oil storage may thereafter be upon the exterior within the above-described portable rubber floating storage tanks.

Having described my invention, reference should now be had to the following claims.

I claim:

1. In combination, a self-propelled barge for the removal of oil and other hazardous floating pollutants from a body of water and having a deck;
   a vacuum tank on the deck;
   an alternately usable suction and pressure pump connected to said tank;
   a buoyant slick bar for containing an area of floating pollutant extending throughout 180° to 360°,
   a skimmer assembly suspended from the barge within said slick bar just below the water level for withdrawing the floating pollutant and including a flexible conduit connected to said vacuum tank;
   a plurality of settling tanks within the barge below said deck;
   conduits interconnecting said vacuum tank respectively with each settling tank;
   valve means at said vacuum tank controlling flow through each conduit successively and alternately, by which the tanks may be uniformly and progressively filled gradually;
   a water siphon extending down into each settling tank having its intake adjacent the tank bottom;
   a water discharge unit on said deck including a power operated suction pump with inlets and an outlet; and a series of water discharge pipes interconnecting said water siphons respectively and said water discharge inlets.

2. In the antipollution barge of claim 1, and a plurality of spaced pad eyes mounted on the deck and secured to the barge to facilitate booming of the barge out of the water for mounting upon a transport.

3. In the antipollution barge of claim 1, anchor spuds on and projecting from the corners of said barge outwardly thereof;
   anchor pipes extending through said spuds and down into the bottom ground surface of the water body for anchoring the barge;
   and a power operated air blower mounted on said deck for moving an area of floating pollutant into a floating slick bar for confining the same.